United States Patent
Miyata

(10) Patent No.: US 7,196,812 B2
(45) Date of Patent: Mar. 27, 2007

(54) INFORMATION PROCESSING APPARATUS AND CONTROL CODE GENERATION METHOD

(75) Inventor: Junichi Miyata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 854 days.

(21) Appl. No.: 10/339,317

(22) Filed: Jan. 10, 2003

(65) Prior Publication Data

US 2003/0133142 A1  Jul. 17, 2003

(30) Foreign Application Priority Data

Jan. 11, 2002  (JP) ............... 2002-004690

(51) Int. Cl.
  *G06F 15/00*  (2006.01)
  *G06F 3/00*  (2006.01)
(52) U.S. Cl. ......................................... 358/1.16; 710/8

(58) Field of Classification Search ............... 358/1.16, 358/1.2, 1.13; 710/8, 19; 399/8, 16, 82; 455/422.1, 558; 382/304; 379/93.2, 88.1; 347/10, 43
See application file for complete search history.

(56) References Cited

U.S. PATENT DOCUMENTS

| | | | | | |
|---|---|---|---|---|---|
| 5,764,869 | A | * | 6/1998 | Bagley et al. | ............. 358/1.16 |
| 6,149,323 | A | * | 11/2000 | Shima | ......................... 400/76 |
| 2003/0077096 | A1 | * | 4/2003 | Potter et al. | ................ 399/366 |
| 2005/0200878 | A1 | * | 9/2005 | Nakazato | ................... 358/1.13 |
| 2005/0200881 | A1 | * | 9/2005 | Yamade | ..................... 358/1.14 |

* cited by examiner

Primary Examiner—King Y. Poon
Assistant Examiner—Saeid Ebrahimi
(74) Attorney, Agent, or Firm—Fitzpatrick, Cella, Harper & Scinto

(57) ABSTRACT

Upon generating control codes to be output to a printing apparatus, an application designates the total number of control codes that can be generated, and when the designated number of control codes that can be generated has been exceeded, subsequent control codes are ceased to be generated, thus avoiding any memory errors and the like.

8 Claims, 17 Drawing Sheets

FIG. 12

APPLICATION DATA HAVE EXCEEDED MAXIMUM
NUMBER OF RENDERING REQUESTS.
SOME DATA ARE NOT OUTPUT.

OK

INFORMATION PROCESSING APPARATUS AND CONTROL CODE GENERATION METHOD

FIELD OF THE INVENTION

The present invention relates to an information processing apparatus and control code generation method for generating control codes to be output to a printing apparatus.

BACKGROUND OF THE INVENTION

In general, in a print system on an operating system (to be abbreviated as an OS hereinafter) which is running on an information processing apparatus, print information (generally called a GDI: Graphic Device Interface function) output from an application program such as document create software, image edit software, or the like is transmitted to a control code generation module (to be referred to as a printer driver hereinafter) as an abstract logical rendering request (generally called a DDI: Device Driver Interface function) via a graphic engine as an internal module of the OS. The printer driver interprets the logical rendering request, and generates a control code group complying with a specific format.

Normally, a printer driver which provides such function is installed on the OS as a software module, and can be used by all application programs which run on the OS. The printer driver provides a control code output function (print function) to all applications, which run on the information processing apparatus.

A control code group generated by the printer driver is transmitted to an output apparatus such as a printer, FAX, or the like via a system spooler of the OS, and is converted into a bitmap image that the user can visually recognize, by an internal rasterize module, thus outputting the bitmap image. Also, the control code group is rasterized by another program module, which can interpret the control codes and is running on the information processing apparatus, and can be displayed on a screen that the user operates. This program module is an application which edits a control code group generated by the printer driver, and combines control code groups of different print jobs, and such application will be referred to as a "print edit application" hereinafter.

Such print edit applications may often be able to interpret different control codes depending on their different internal algorithms or different hardware resources of active devices, even when a command system (command group) of control codes to be interpreted remains the same.

For example, assume that module A which edits and processes a given control code can only assure a maximum of 10,000 memory areas for image data embedded in a control code due to an insufficient hardware resource. At this time, when more than 10,000 image data are embedded in a control code, a memory assurance error occurs, and a process may be canceled.

On the other hand, another edit process module B can interpret more than 10,000 image data if it does not have the aforementioned limitation. That is, a control code that can be interpreted differs depending on edit process modules.

This problem may cause the following situation.

For example, if there are a plurality of edit process modules which can interpret a given common control code, a control code output from another module (printer driver) which outputs this common control code may be edited by an edit process module having the highest performance, but may not always be edited by an edit process module having the lowest performance. That is, a memory error or the like occurs depending on the performance of an edit process module, and the operation itself may be forcibly terminated.

As described above, in the current print system, the printer driver which is running on the OS is normally installed on the OS as a software module, and can be used by all application programs which run on the OS. Also, the printer driver provides a print function to all applications, which run on the information processing apparatus.

However, under the present circumstances, if a plurality of edit process modules, which recognize control codes output from the printer driver, are present on the information processing apparatus, it is impossible to recognize the characteristics of individual edit process modules, and to customize control codes. For example, a given printer driver outputs specific control codes, but these control codes cannot always be rendered by all edit process modules which recognize control codes. Also, when an edit process cannot executed by a given edit process module, a series of processes may be canceled.

SUMMARY OF THE INVENTION

The present invention has been made to solve the aforementioned problems, and has as its object to allow an application as an output destination of control codes to set the total number of control codes which can be generated, and can be printed out by a printing apparatus.

In order to achieve the above object, according to one aspect of the present invention, there is provided an information processing apparatus for generating control codes that can be printed out by a printing apparatus, comprising: control code generation means for generating control codes that can be printed out by the printing apparatus; and setting means for setting the total number of control codes that can be generated, in accordance with a designation from an application as an output destination of the control codes, wherein when a number of control codes generated by the control code generation means has exceeded the set total number of control codes set by the setting means, the control code generation means stops generating subsequent control codes.

According to one aspect of the present invention, there is provided a control code generation method for generating control codes that can be printed out by a printing apparatus, comprising: the control code generation step of generating control codes that can be printed out by the printing apparatus; and the setting step of setting the total number of control codes that can be generated, in accordance with a designation from an application as an output destination of the control codes, wherein the control code generation step includes the step of stopping generating subsequent control codes when a number of control codes generated by the control code generation step has exceeded the set total number of control codes set by the setting step.

According to one aspect of the present invention, there is provided a program for making a computer implement a control code generation method.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 12 shows a user interface displayed when the number of rendering requests that can be output has exceeded;

DETAILED DESCRIPTION OF THE PREFERRED EMBODIMENTS

Preferred embodiments of the present invention will be described in detail hereinafter with reference to the accompanying drawings.

Figure 1A:
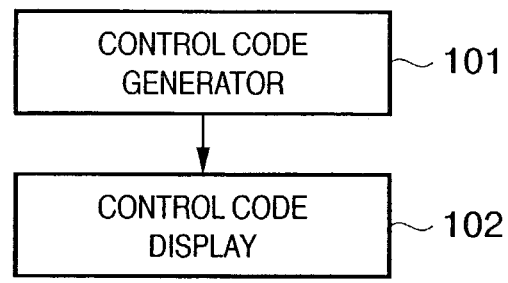
FIGS. 1A to 1C are block diagrams showing an outline of a system in an embodiment of the present invention.
Figure 1B:
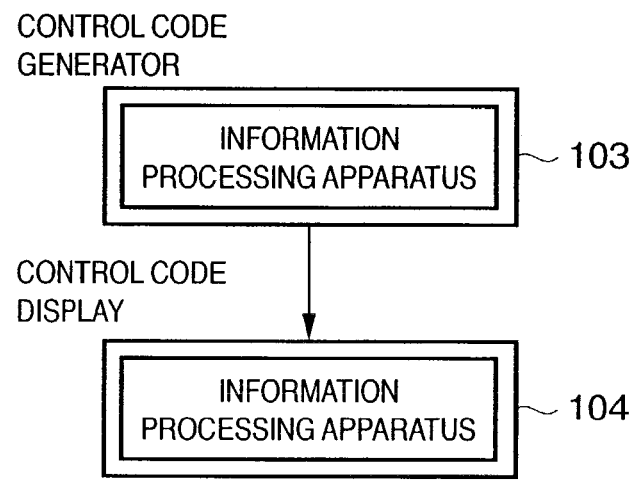
Figure 1C:
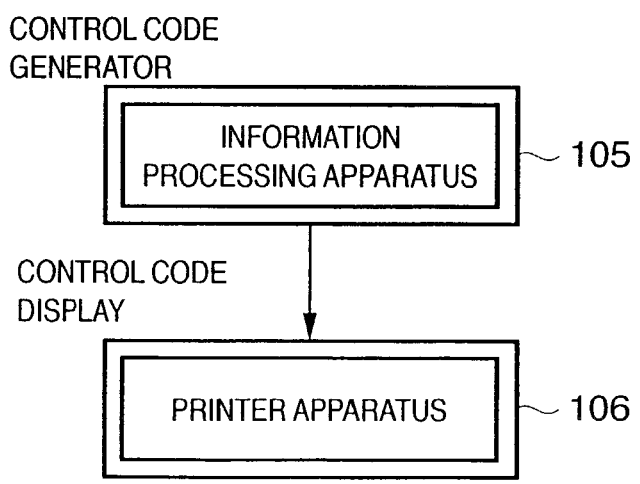

FIGS. 1A to 1C are block diagrams showing an outline of a system in this embodiment. In FIG. 1A, reference numeral 101 denotes a control code generator which generates control codes that a specific program module can recognize. Also, control codes generated by the control code generator 101 can be used as a print job which can be interpreted and printed out by a printing apparatus. As an example of the control code generator 101, a PDF Writer or the like is known. Reference numeral 102 denotes a control code display which displays control codes generated by the control code generator 101 as a rasterized bitmap image to the user. A print edit application comprises a control code display module. This print edit application also comprises an edit process module that executes an edit process for, e.g., combining a series of control codes, which correspond to a print job and are generated by the control code generator 101 in response to a single instruction, in addition to the rasterize process. That is, the print edit application is software for executing a process for combining different control codes generated by a document create application, table create application, and the like into a single document, and a page handling process for replacing the order of pages.

FIGS. 1B and 1C show general patterns of a control code generator and print edit application (control code display). In the pattern shown in FIG. 1B, a control code generator 103 is a program module which runs on an information processing apparatus such as a personal computer or the like, and a control code display 104 of a print edit application is a program module which displays generated control codes on the identical information processing apparatus or another information processing apparatus on a network as a bitmap image that the user can recognize.

Furthermore, in the pattern shown in FIG. 1C, a control code generator 105 is a program module which runs on an information processing apparatus such as a personal computer or the like, and a control code display 106 is an output apparatus such as a printer apparatus, FAX apparatus, or the like, which is active on a network, and makes display by interpreting control codes and outputting a print as a bitmap image that the user can recognize.

Figure 2A:
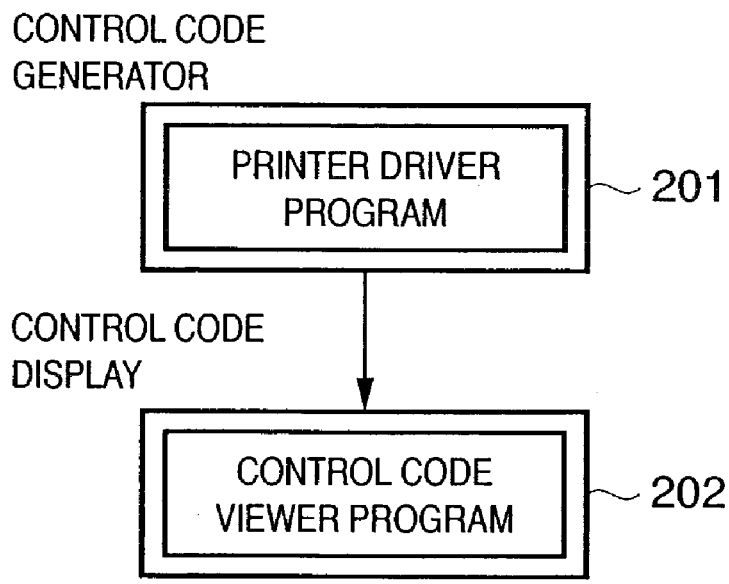
FIGS. 2A and 2B are block diagrams specifically showing principal program modules shown in FIGS. 1B and 1C.
Figure 2B:
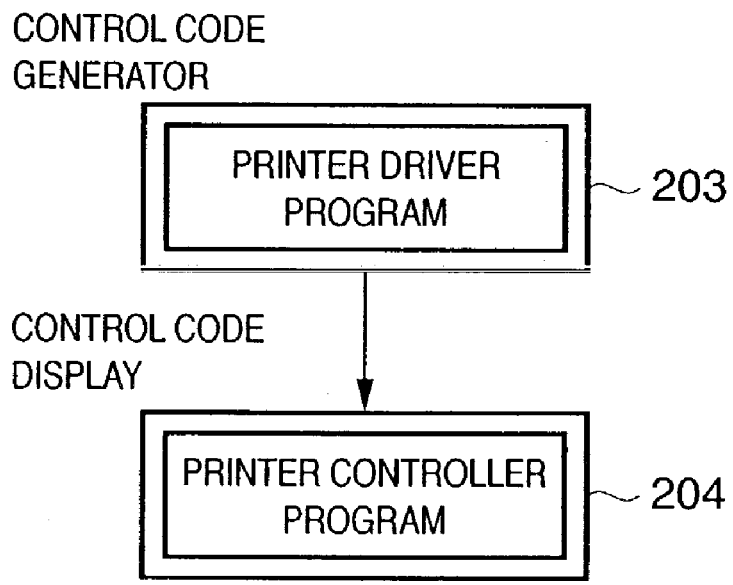

FIGS. 2A and 2B specifically express principal program modules shown in FIGS. 1B and 1C. FIG. 2A shows the pattern shown in FIG. 1B. In this example, a control code generator 201 is a printer driver program, which runs on an information processing apparatus, and generates control codes. A control code display 202 is a viewer program which interprets control codes and displays them on a display.

Likewise, FIG. 2B shows the pattern shown in FIG. 1C. In this example, a control code generator 203 is a printer driver program, which runs on an information processing apparatus, and generates control codes. A control code display 204 is a printer controller, which rasterizes control codes and outputs them as image data on a print sheet.

Figure 3:
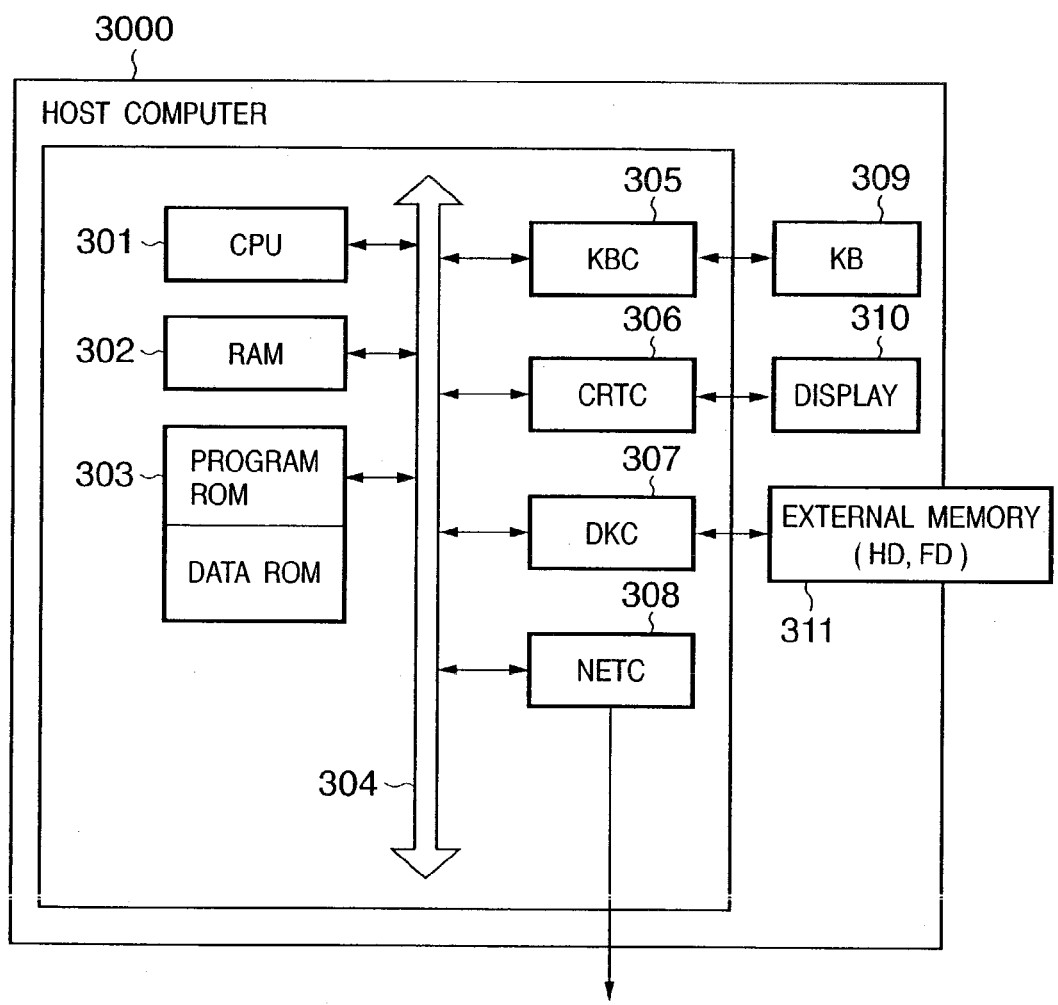
FIG. 3 is a block diagram showing the arrangement of an information processing apparatus on which a print system of this embodiment can run.

FIG. 3 is a block diagram showing the arrangement of an information processing apparatus on which a print system of this embodiment runs. Referring to FIG. 3, reference numeral 3000 denotes an information processing apparatus, which comprises a CPU 301 for processing a document that includes graphic data, image data, text data, table data (including spreadsheet data), and the like together on the basis of an application program stored in a program ROM in a ROM 303 or an external memory 311. The CPU 301 systematically controls respective devices connected to a system bus 304. The program ROM in the ROM 303 or the external memory 311 stores an operating system (to be abbreviated as an OS hereinafter) or the like as a control program of the CPU 301, and a data ROM in the ROM 303 or the external memory 311 stores various data used in the aforementioned document process.

Reference numeral 302 denotes a RAM which serves as a main memory, work area, and the like of the CPU 301. Reference numeral 305 denotes a keyboard controller (KBC) for controlling key inputs from a keyboard 309 and a pointing device (not shown). Reference numeral 306 denotes a video controller (CRTC) for controlling display on a CRT display (CRT) or liquid crystal display 310. Reference numeral 307 denotes a disk controller (DKC) for controlling access to the external memory 311 which comprises a hard disk (HD), floppy disk (FD), and the like that store a boot program, various applications, font data, user files, edit files, print edit applications, a printer driver according to this embodiment, and the like. Reference numeral 308 denotes a network controller (NETC) which is connected to a printer apparatus or the like via a predetermined interface, and executes a communication control process.

Note that the CPU 301 executes a rasterize process onto a display information RAM assured on, e.g., the RAM 302 via a rasterize program, thus allowing display on the display 310. The CPU 301 opens various registered windows on the basis of commands designated by a mouse cursor or the like (not shown) on the display 310, and executes various data processes. Furthermore, the user can open a window associated with the setups of a printer driver for a printer which is connected, and can set a print processing method for the printer driver upon executing a print process.

Figure 4:
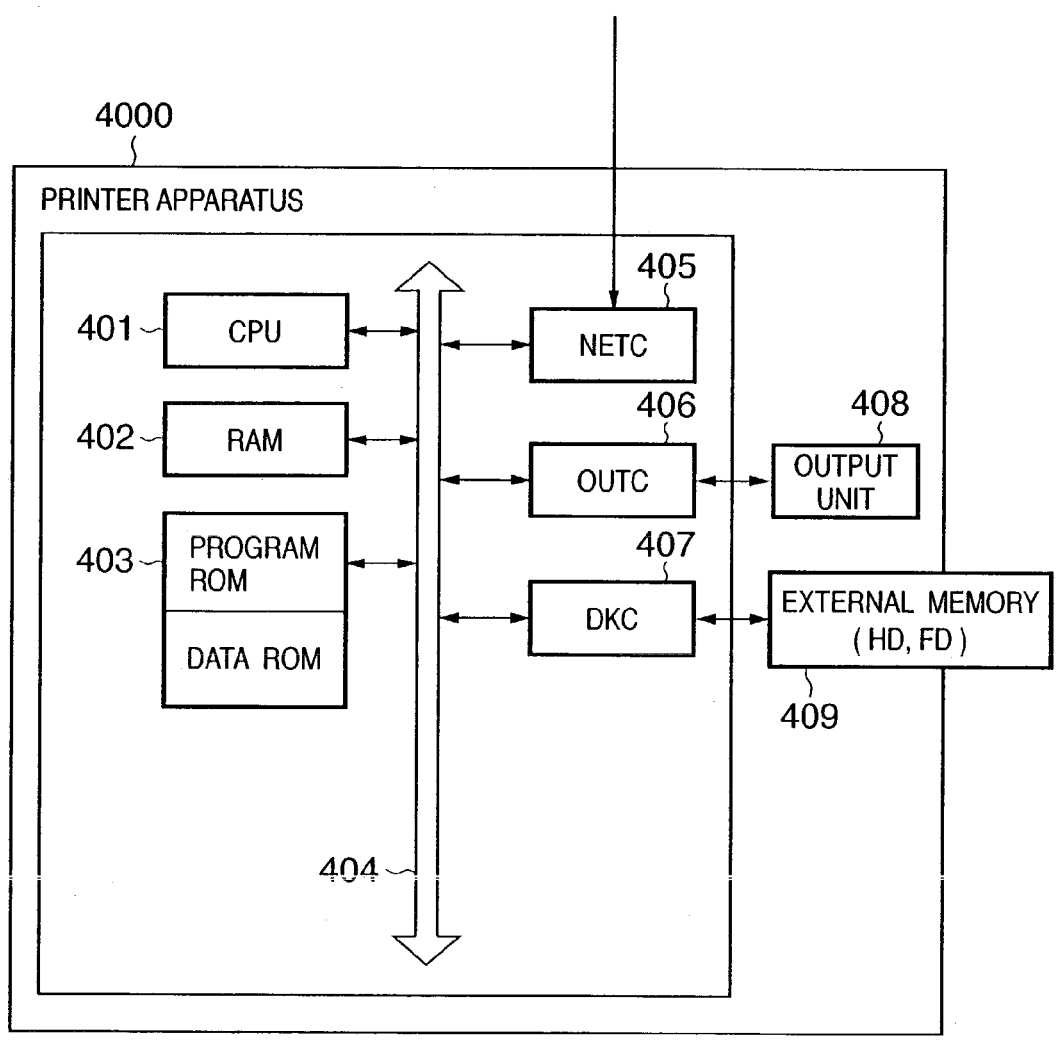
FIG. 4 is a block diagram showing the arrangement of a printer apparatus on which the print system of this embodiment can run.

FIG. 4 is a block diagram showing the arrangement of a printer apparatus on which the print system of this embodiment can run. Referring to FIG. 4, reference numeral 4000 denotes a printer apparatus which comprises a CPU 401 for executing a printer controller program or the like stored in a program ROM in a ROM 403 or an external memory 409. The CPU 401 systematically controls respective devices connected to a system bus 404. The program ROM in the ROM 403 or the external memory 409 stores an OS or the like as a control program of the CPU 401, and a data ROM in the ROM 403 or the external memory 409 stores various data such as font data and the like, which are used upon displaying text.

Reference numeral 402 denotes a RAM which serves an a main memory, work area, and the like of the CPU 401. Reference numeral 406 denotes an output controller (OUTC), which rasterizes control codes transferred from the host computer by a control program that runs under the control of the OS, and outputs them as image data to an output unit 408 that forms an image on a print sheet and outputs the print sheet onto an exhaust tray or the like. Reference numeral 407 denotes a disk controller (DKC) for controlling access to the external memory 409 which comprises a hard disk (HD) or the like that store a boot program, font data, and the like. Reference numeral 405 denotes a network controller (NETC) which is connected to the information processing apparatus via a predetermined interface, and executes a communication control process with the information processing apparatus.

Note that control codes input via the predetermined interface are rasterized on a storage area of the RAM 402, external memory 409, or the like by a printer control program loaded onto the RAM 402 under the control of the CPU 401, and are output to the output unit 408 that prints an image on a medium such as a paper sheet or the like, via the output controller 406.

Figure 5:
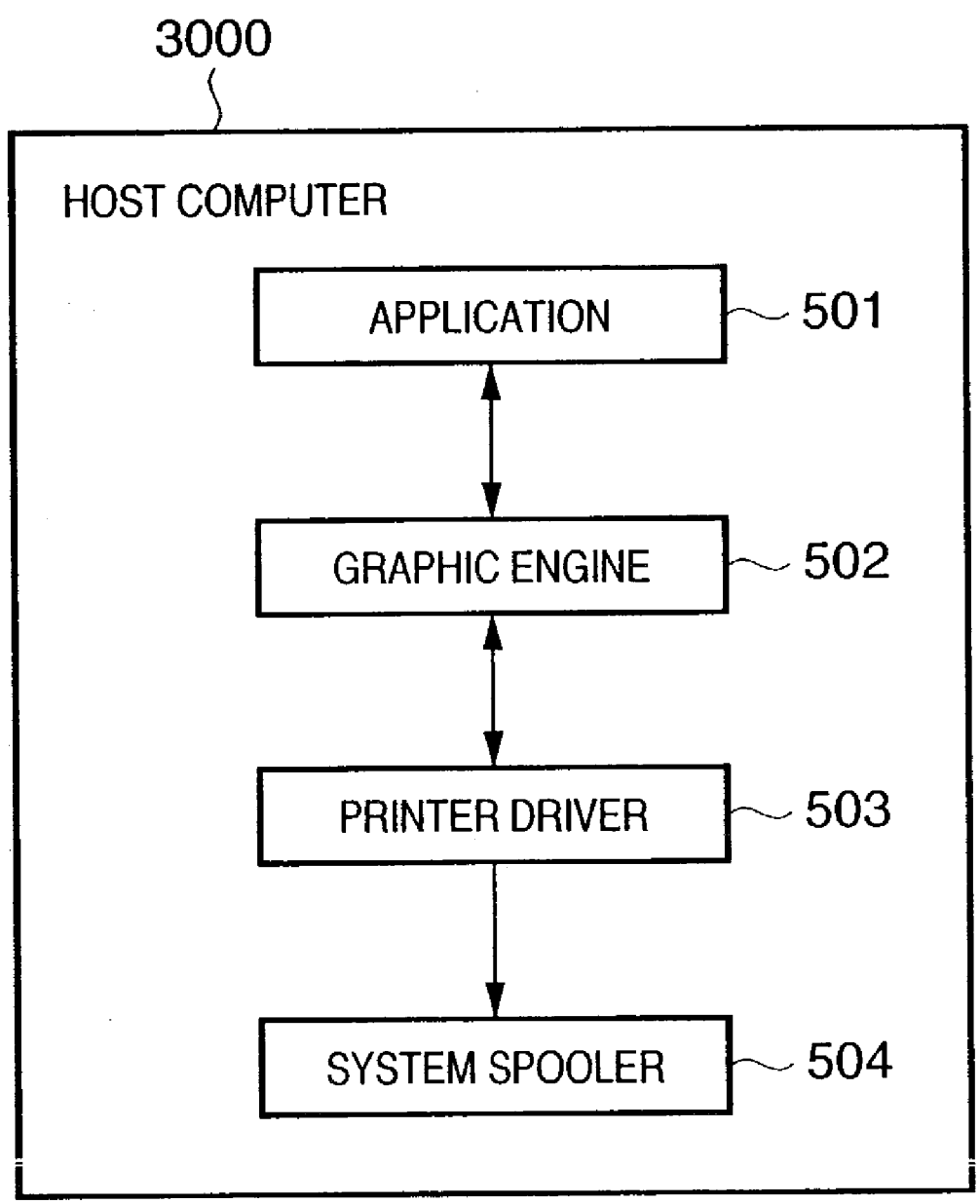
FIG. 5 is a block diagram showing the arrangement of a typical print processing module of a host computer.

FIG. 5 shows the arrangement of a typical print processing module of the host computer. This print processing module is loaded from the external memory 311 onto the RAM 302, and is executed by the CPU 301. As shown in FIG. 5, the print processing module includes an application 501 such as a document processing program or the like, a graphic engine 502 provided by the OS, a printer driver 503 for processing a print rendering command passed from the application 501 via the graphic engine 502, and a system spooler 504 for outputting control codes received from the printer driver 503 to a printer on a network, a specific file, or the like. These modules are program modules which are present as files saved on the external memory 311, are loaded onto the RAM 302 by the OS upon execution, and are executed. The application 501 and printer driver 503 can be added from the FD or a CD-ROM (not shown) of the external memory 311 or from an external HD via a network (not shown).

The application 501 saved in the external memory 311 is loaded onto the RAM 302, and is executed. When a print instruction is issued from the application 501 to the printer driver 503, an output process is done via the graphic engine 502 which is similarly loaded onto the RAM 302 and is ready to be executed. The graphic engine 302 is similarly loaded from the external memory 311 onto the RAM 302 as in the printer driver 503, converts a GDI function as a rendering request of the application 501 into a DDI function as a rendering function that the printer driver 503 can interpret, and transfers the DDI function as the converted rendering function to the printer driver 503. On the other hand, the printer driver 503 converts the received rendering command into specific control codes that the printing apparatus can print out. The control codes generated by the printer driver 503 are sent to a printer apparatus on a network via the system spooler 504 or are output as a file onto a file system such as the external memory 311.

Figure 6:
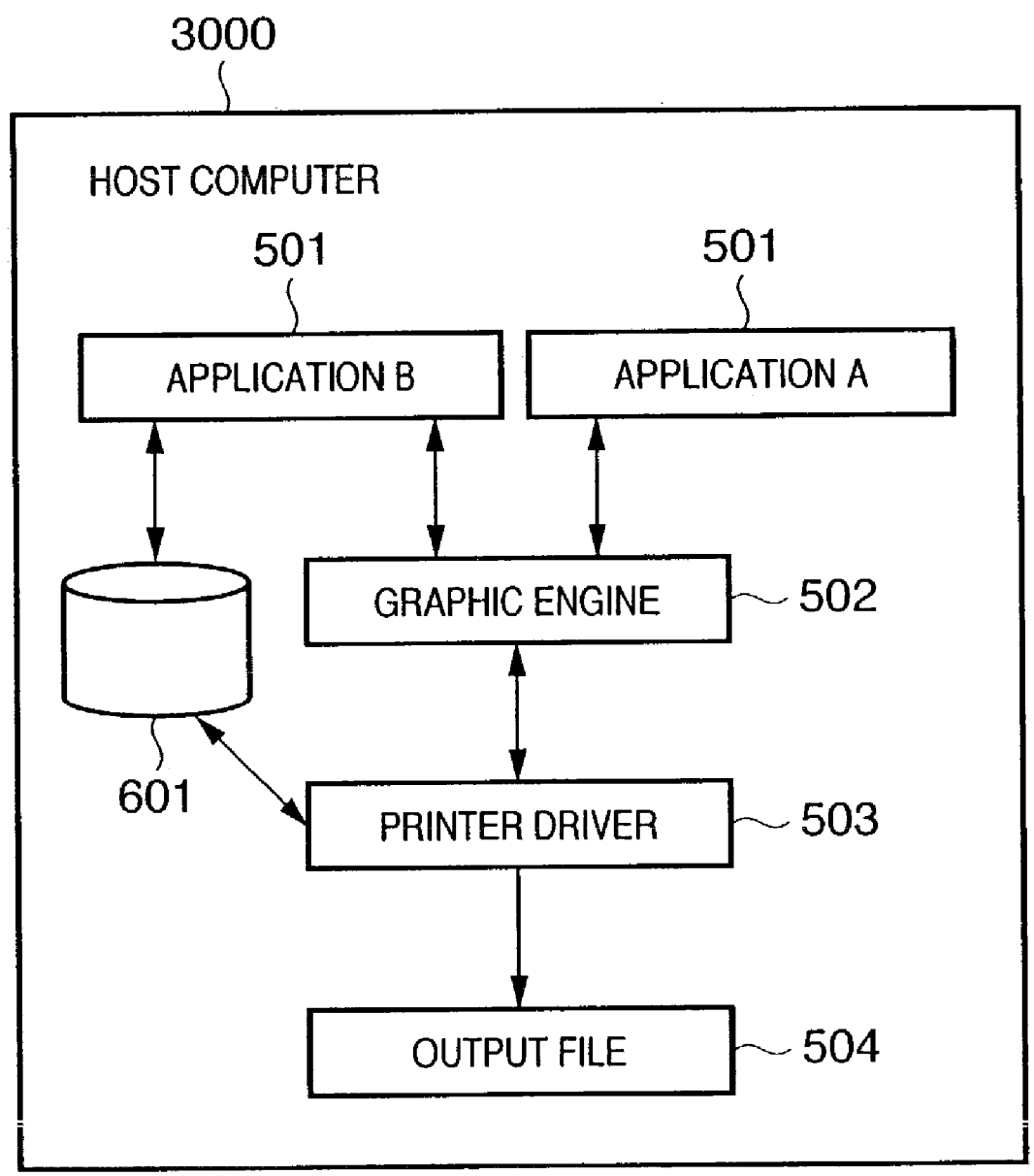
FIG. 6 is a block diagram showing an information communication pattern between applications and a printer driver program in this embodiment.

FIG. 6 shows the information communication pattern between applications and a printer driver program in this embodiment. Assume that applications A and B (501) are loaded onto the RAM 302 and are ready to be executed, as shown in FIG. 6. Note that the number of applications which are launched at the same time is not limited to two, but may be three or more.

Referring to FIG. 6, reference numeral 601 denotes a storage area on a file system represented by the external memory 311, which area is used by the printer driver 503 and applications 501 for information communications. Note that a specific application 501 (corresponding to a print edit application) and the printer driver 503 write information on this storage area 601 and read the written information, thus establishing communications.

Figure 7:
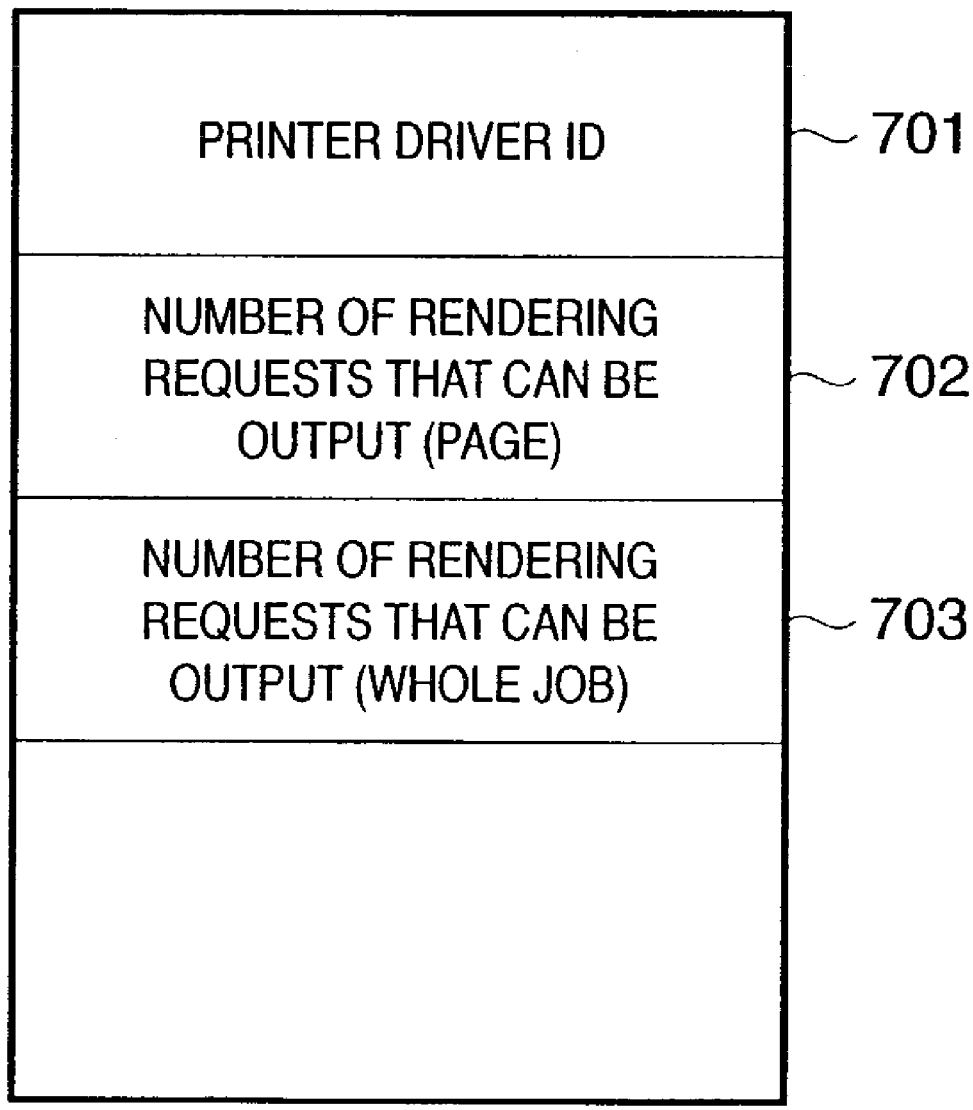
FIG. 7 shows a storage area for information communications in this embodiment.

FIG. 7 shows the storage area for information communications in this embodiment. In this example, a field 701 stores an ID used to identify the printer driver 503, and a field 702 saves the total number of rendering requests per page, which is set by the application 501 and can be output by the printer driver 503. A field 703 saves the total number of rendering requests per print job (a series of control data), which is set by the application 501 and can be output by the printer driver 503. The format of the storage fields 701, 702, and 703 is not particularly limited as long as it can be recognized by the printer driver 503 and application 501.

Figure 8:
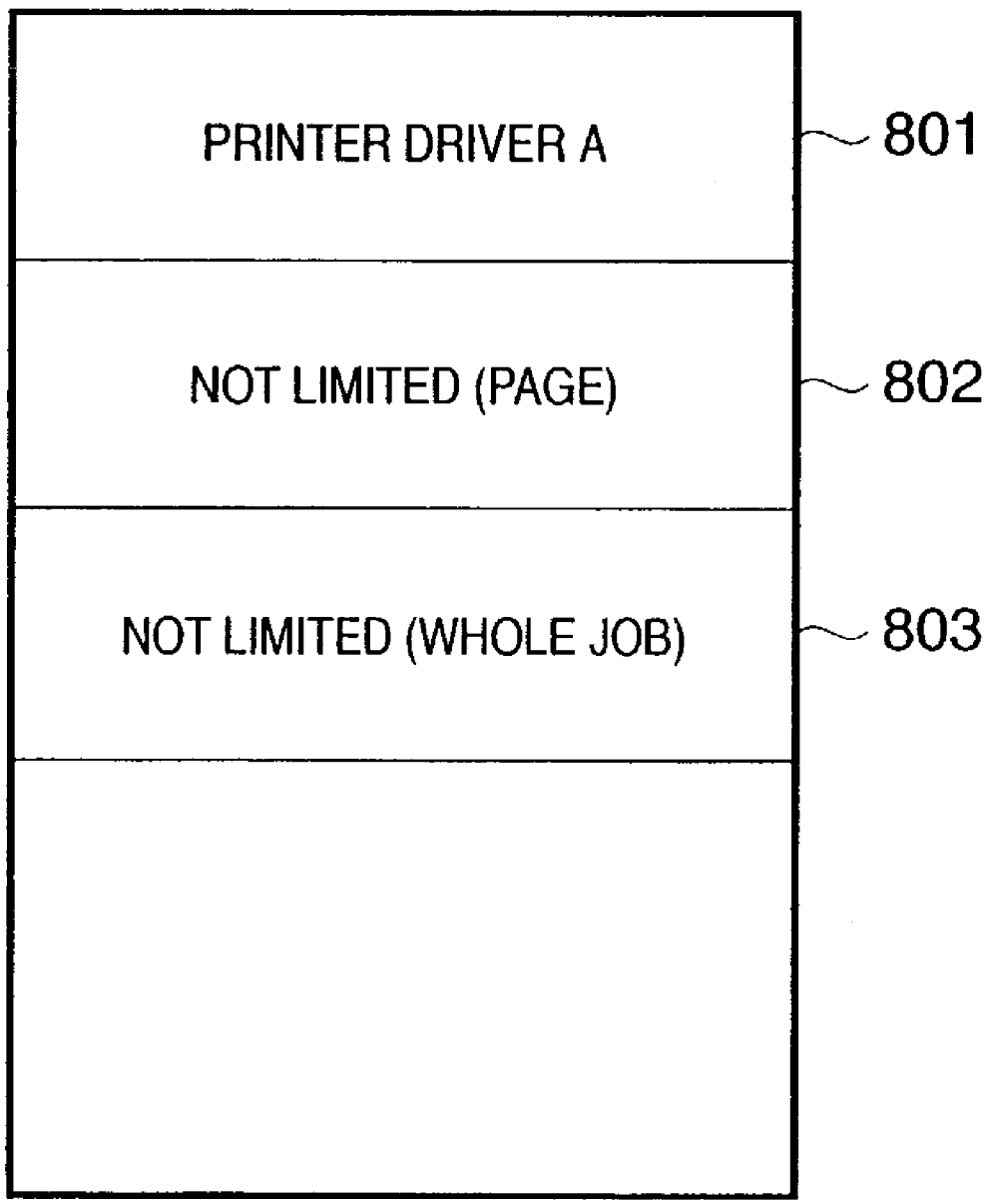
FIG. 8 shows the configuration of the storage area for information communications shown in FIG. 7.

In a normal state without any print process, the storage area 601 has a configuration shown in FIG. 8. A character string "printer driver A" is set in an ID field 801 used to identify a printer driver, and "not limited" is set in fields 802 and 803 that store the total numbers of rendering requests per page and per whole print job that can be output. In the normal state, since the output destination of the printer driver is a printing apparatus, which has no hardware limitations on a rendering process, the number of rendering requests that can be output is not limited.

Figure 9:
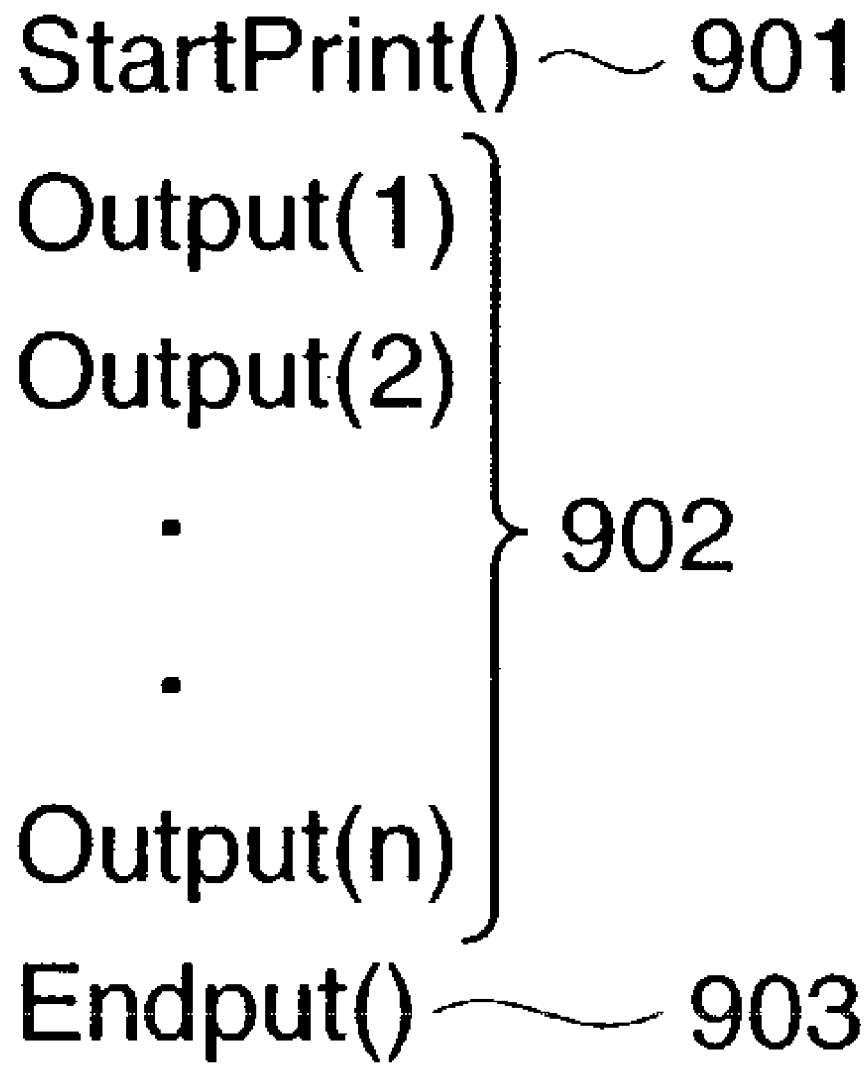
FIG. 9 shows an example of a print command requested from a graphic engine 502 to a printer driver 503 in this embodiment.

At the beginning of a print process from the application 501 that executes processes such as a document process and the like on the information processing apparatus, a print request (GDI function) from the application 501 is converted into a print command (DDI function) via the graphic engine 502, and the print command is sent to the printer driver 503. FIG. 9 shows an example of a print command requested from the graphic engine 502 to the printer driver 503 in this embodiment. Assume that a print request passed from the graphic engine 502 can determine the start and end of a print process. Also, the print request starts from a print start command (StartPrint ( )) 901, and ends with a print end command (EndPrint ( )) 903 via an arbitrary number (n) of rendering requests (Output(1), Output(2), . . . , Output(n)) 902, as shown in FIG. 9.

The process of the printer driver 502, which interprets a print command received from the application 501 via the graphic engine, converts it into control codes for each page, and outputs the control codes as a page rendering file (PDF: Page Description File) when the application 501 does not designate any number of rendering requests that can be output, "not limited" in the normal state is set, will be described below.

Figure 10:
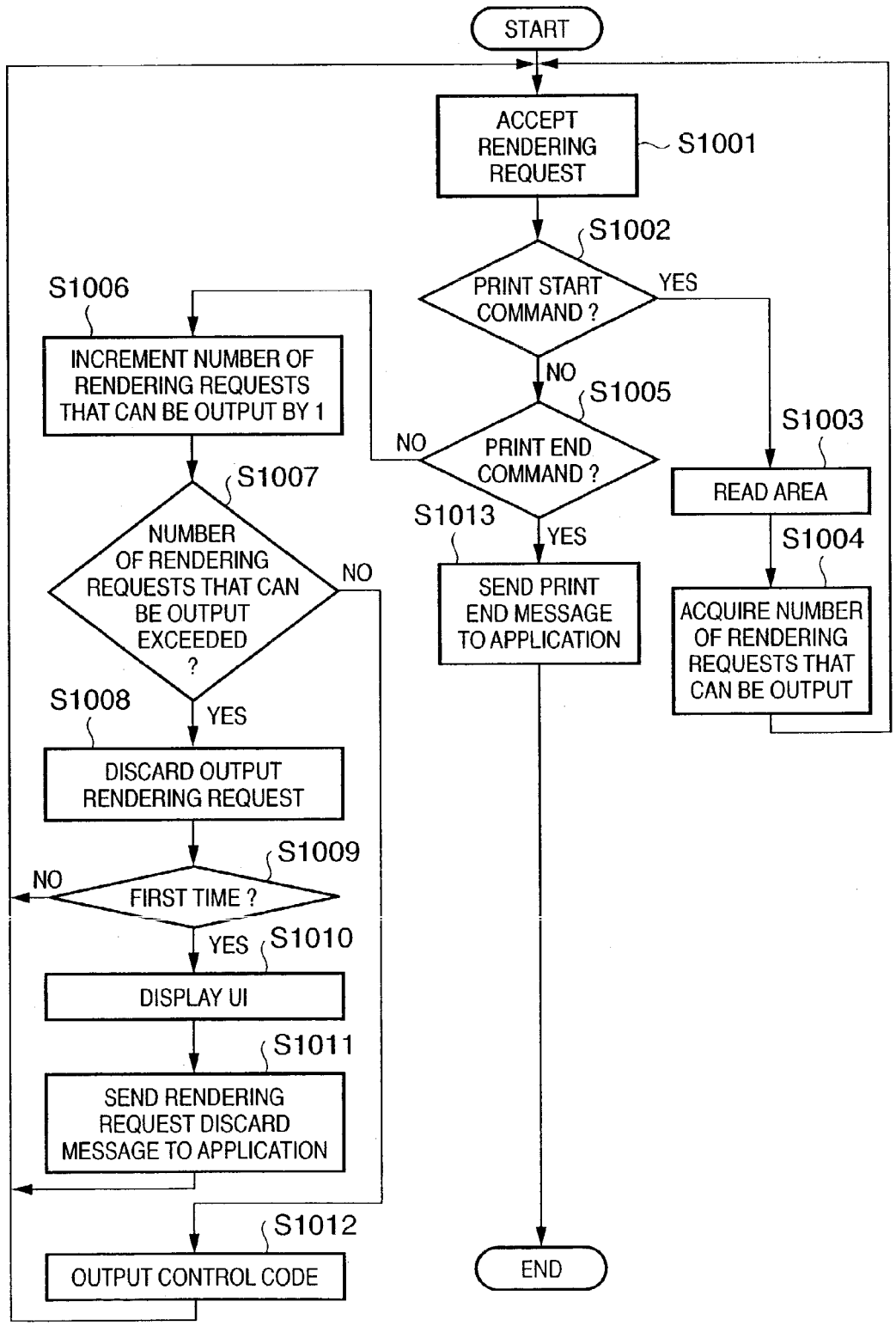
FIG. 10 is a flow chart showing an output process in this embodiment.

FIG. 10 is a flow chart showing an output process in this embodiment. When the application 501 instructs to start a print process, the printer driver 503 accepts a rendering request via the graphic engine 502 in step S1001. The printer driver 503 checks in step S1002 if this rendering request is a print start command. At the beginning of the print process, since the printer driver 503 receives a print start command (StartPrint) 901 from the application 501 via the graphic engine 502, the flow advances to step S1003, and the printer driver 503 reads out the contents of the storage area 601, which is common to the OS. A reference position in this storage area 601 can be determined by checking the ID of the printer driver in the field 701. At this time, the storage area 601 is in an initial state, and is set with values shown in FIG. 8. The printer driver 503 reads the default number of rendering requests that can be output (in this case, not limited) from the field 802 that stores the number of rendering requests per page that can be output, and holds this value as internal data in step S1004. The flow then returns to step S1001.

The printer driver 503 accepts a rendering request via the graphic engine 502 in step S1001. This rendering request is one (Output(1)) of rendering commands 902, and is neither a print start command in step S1002 nor a print end command in step S1005. Hence, the flow advances to step S1006 to increment the number of output rendering requests as internal data. The printer driver 503 checks in step S1007 if the incremented value has exceeded the number of rendering requests that can be output, which is acquired in step S1004. In this case, since the number of rendering requests that can be output is "not limited", the flow jumps to step S1012 to convert this rendering request into control codes. This operation is repeated until a print end command (EndPrint) 903 is received in step S1005. After that, upon receiving the print end command 903, the flow advances to step S1013, and the printer driver 503 sends a print end message to the application 501. In general, this print end message can be sent via the graphic engine 502.

After the application 501 acquires this print end message in this way, it can acquire and refer to an output file if the output destination is a file.

Figure 11:
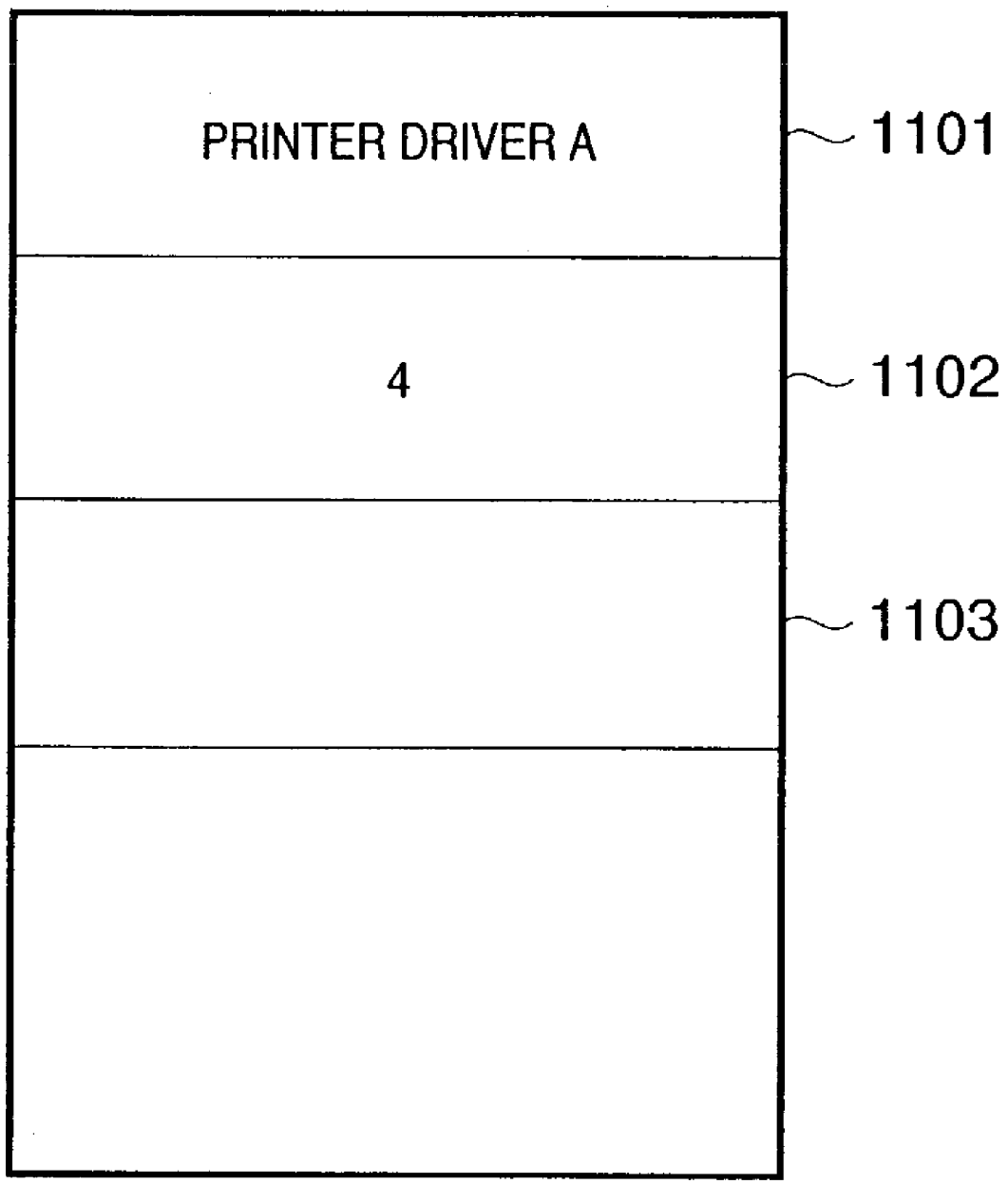
FIG. 11 shows the contents of a storage area loaded at the beginning of a print process.

An output process executed when the application 501 has changed the number of rendering requests that can be output (in this case, the number of rendering requests per page that can be output) in the storage area 601, as shown in FIG. 11, before the beginning of the print process, will be explained below. In this embodiment, assume that application B limits the number of rendering requests that the printer driver 503 can output to a maximum of "4". When application A (501) sets application B (501) as the output destination of the printer driver in place of a printing apparatus, the number of rendering requests that can be output is set on the basis of information received from application B (501).

In step S1001, the printer driver 503 accepts a rendering request at the beginning of a print process from application A. The printer driver 503 checks in step S1002 if this rendering request is a print start command. At the beginning of the print process, the printer driver 503 receives a print start command (StartPrint) 901, and the flow advances to step S1003. The printer driver 503 then reads out the contents of the storage area 601, which is common to the OS, in step S1003. Note that the reference position in the storage area can be identified by checking the ID of the printer driver in the field 701. At this time, since the output destination of the printer driver is application B, values shown in FIG. 11 are set in the storage area 601 by application B. The printer driver 503 reads the number of rendering requests per page that can be output ("4" in this case), and holds this value as internal data in step S1004. The flow then returns to step S1001.

The printer driver 503 accepts a rendering request via the graphic engine 502 in step S1001. This rendering request is one (Output(1)) of rendering commands 902, and is neither a print start command in step S1002 nor a print end command in step S1005. Hence, the flow advances to step S1006 to increment the number of output rendering requests as internal data. The printer driver 503 checks in step S1007 if the incremented value has exceeded the number of rendering requests that can be output, which is acquired in step S1004. In this case, since the number of rendering requests that can be output is "4", it is determined that the incremented value has not exceeded the number of rendering requests that can be output yet, and the flow jumps to step S1012 to convert this rendering request into control codes. This operation is repeated until four logical rendering commands 902 are received.

Upon receiving the fifth logical rendering command, it is determined in step S1007 that the upper limit of the number of rendering requests that can be output has been exceeded, and the flow advances to step S1008 to discard this logical rendering request, i.e., not to convert it into control codes. In this embodiment, since the fifth rendering request is the first logical rendering request which has exceeded the upper limit, a user interface shown in FIG. 12 is displayed in step S1010 to inform the user that the logical rendering request is ignored. In step S1011, information indicating that the logical rendering request is ignored is sent to application A that has made the print process in practice. In general, this information can be sent to application A via the graphic engine 502. Note that subsequent logical rendering requests are ignored since NO is determined in step S1009.

After that, upon receiving a print end command 903 in step S1005, the flow advances to step S1013, and the printer driver 503 sends a print end message to application A. Normally, this print end message can be sent via the graphic engine 502.

After the application 501 acquires this print end message in this way, it can acquire and refer to an output file.

Figure 13:
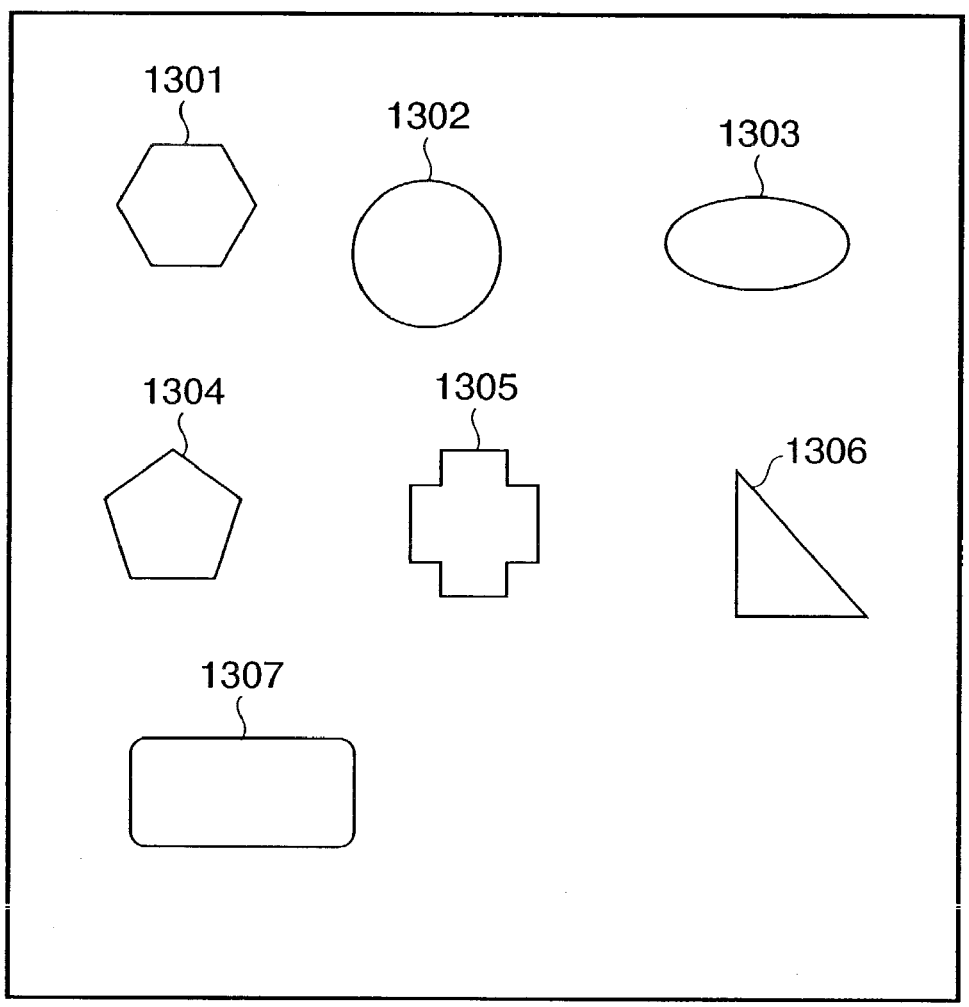
FIG. 13 shows an example of rendering data printed from application B.

FIG. 13 shows an example of rendering data printed from application A. FIG. 13 shows original application data. Assume that objects 1301 to 1307 correspond to logical rendering requests Output(1) to Output(7) in the print process.

Figure 14:
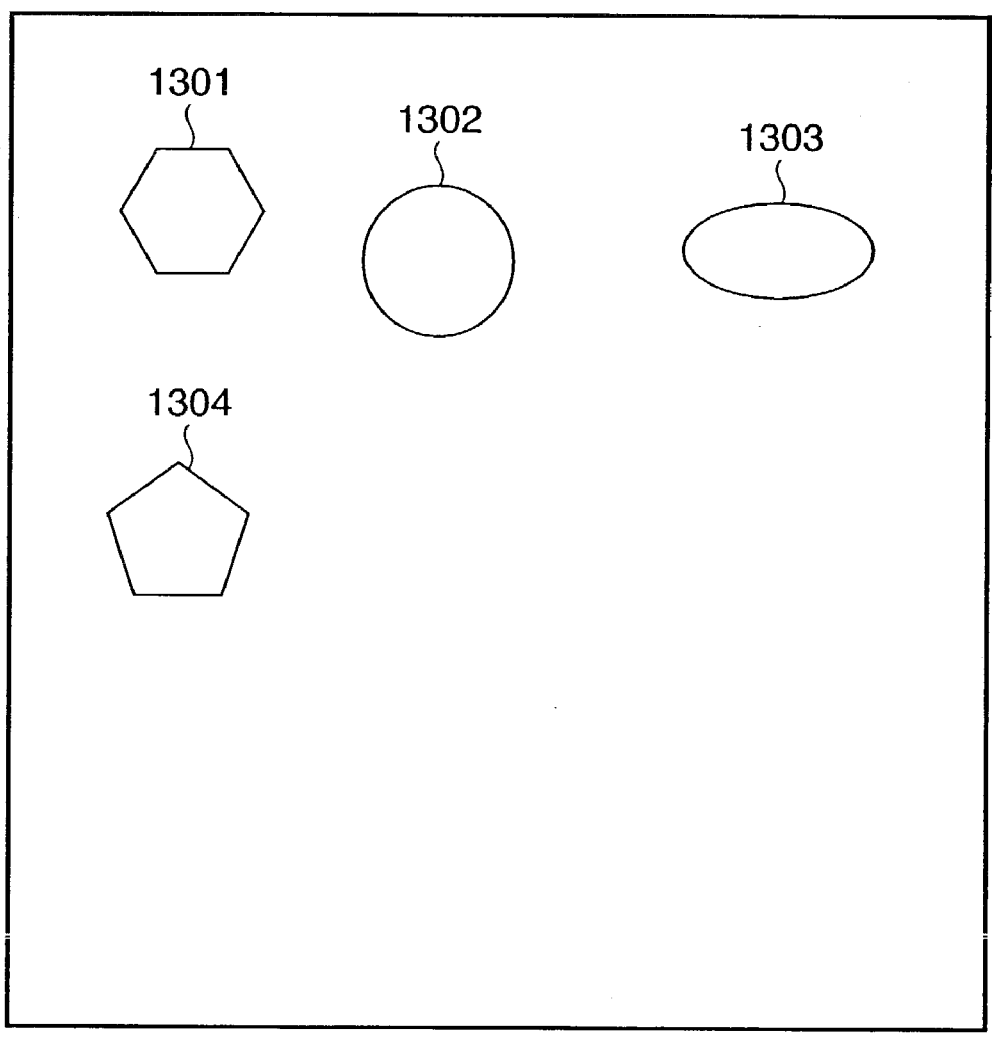
FIG. 14 shows a result after logical rendering requests 5, 6, and 7 are deleted.

In this embodiment, since logical rendering requests Output(1) to Output(4) are output as control codes, data rendered by the control code display 102 are, as shown in FIG. 14, and logical rendering requests 5, 6, and 7 are deleted.

This embodiment has exemplified a case wherein the application as the output destination of the printer driver sets the number of rendering requests per page that can be output. Also, even when the number of rendering requests per whole job that can be output is set, the same processes can be done by checking, for each page, the number of rendering requests that can be output in step S1007 in FIG.

10, and also checking if the number of output rendering requests exceeds the number of rendering requests per whole job that can be output.

ANOTHER EMBODIMENT

Processes in another embodiment of the present invention will be described below.

Note that the arrangement in this embodiment is the same as that in the aforementioned embodiment, and differences will be mainly explained below.

The above embodiment has explained a case wherein the application that sets the number of rendering requests that can be output, which is acquired in step S1004 in the flow chart of FIG. 10, in the common storage area 601 is different from the application that starts a print process. Alternatively, the single application may also make a setup.

This embodiment will explain a case wherein before application B starts a print process, identical or another application B or C changes setup contents in the storage area 601 in advance in accordance with user's designations. After that, all applications that use the printer driver 503 execute the rendering process shown in FIG. 10.

Figure 15:
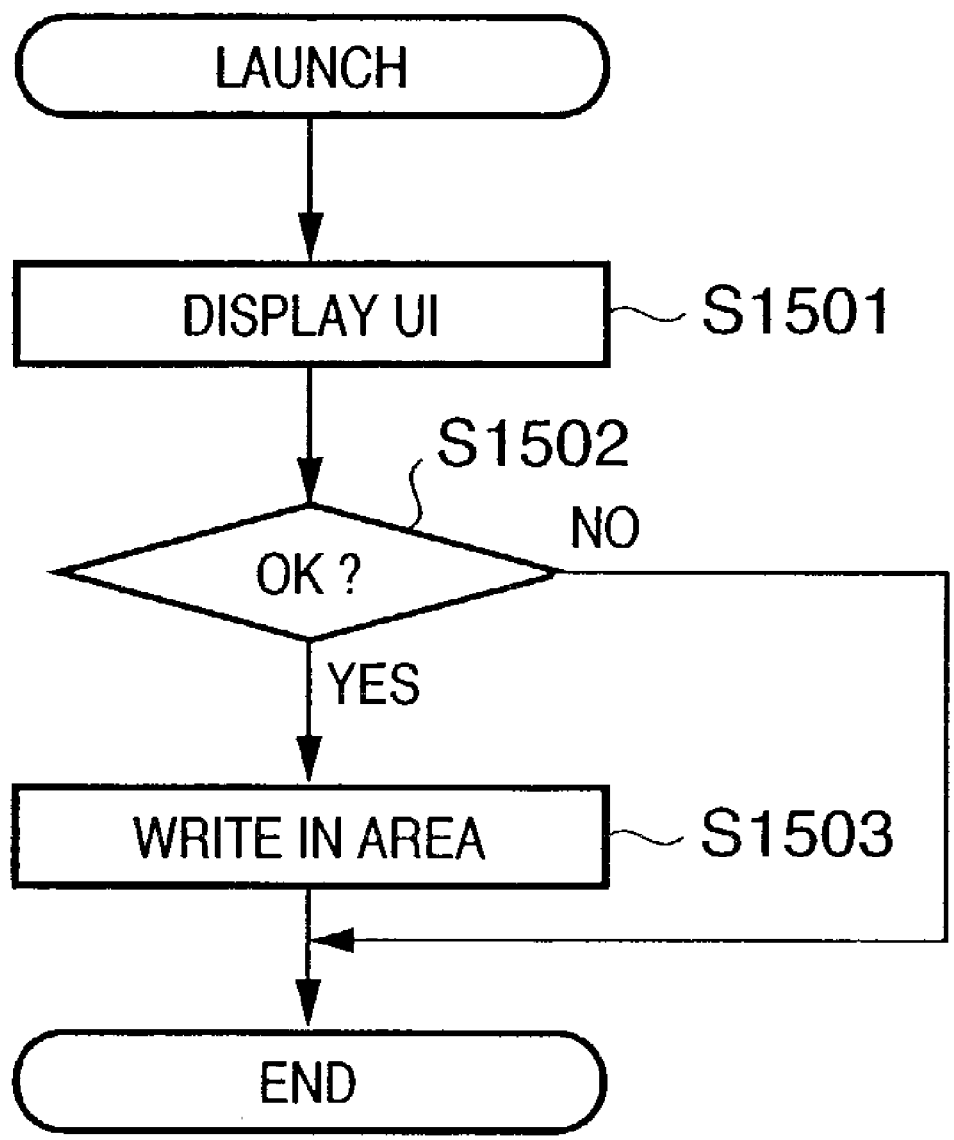
FIG. 15 is a flow chart showing a change process of application C in another embodiment.
Figure 16:
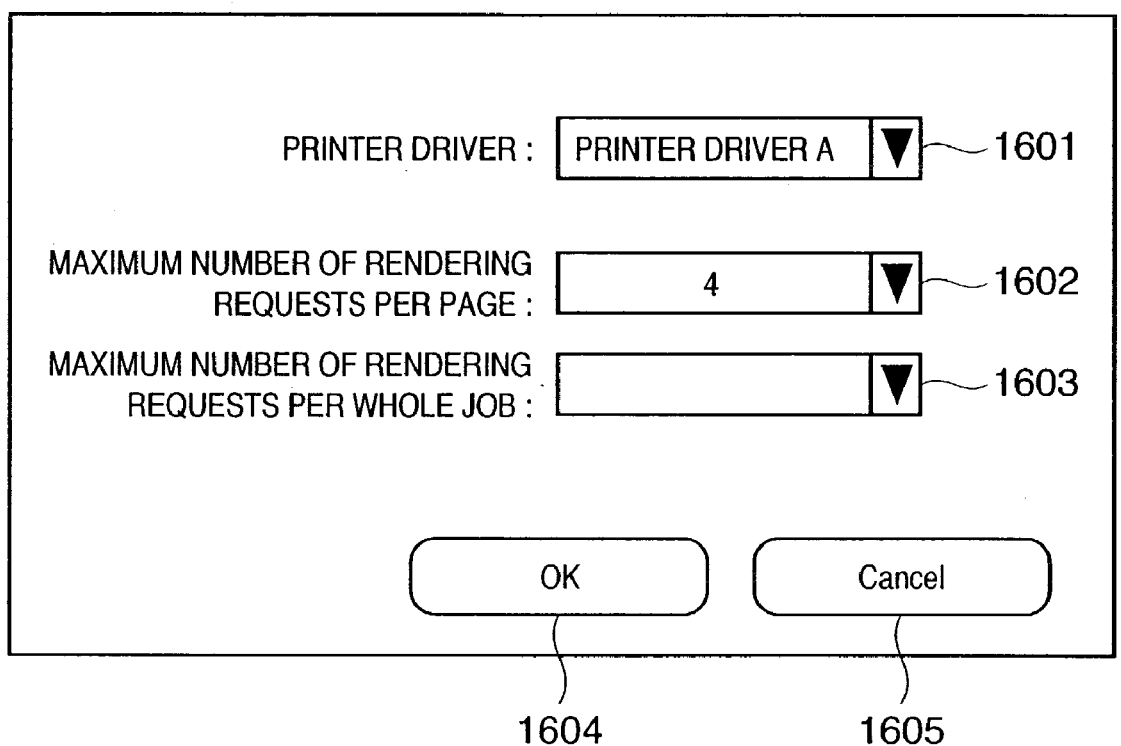
FIG. 16 shows a user interface in another embodiment.

FIG. 15 is a flow chart showing a change process of application B (C) in this embodiment. When application C is launched at an arbitrary timing, application B (C) displays a user interface shown in FIG. 16 in step S1501. Referring to FIG. 16, reference numeral 1601 denotes a field where the user sets a specific printer driver; 1602, a field where the maximum number of rendering requests per page of the set printer driver is determined; and 1603, a field where the maximum number of rendering requests per whole job is similarly determined.

When the user presses an OK button 1604 after he or she sets the contents of the printer driver setup field 1601 and the fields 1602 and 1603 of the maximum numbers of rendering requests per page and per whole job, the flow advances from step S1502 to step S1503, and application C writes setup values in the storage area 601. If the user has made setups, as shown in FIG. 16, the contents of the storage area 601 are set, as shown in FIG. 11, after this process. The printer driver 503 refers to this storage area 601 as in the above embodiment, and runs while limiting the number of output rendering requests.

In this embodiment, the print edit application as the output destination displays a user interface. Alternatively, data may be directly written in the storage area 601 without displaying any user interface.

Figure 17:
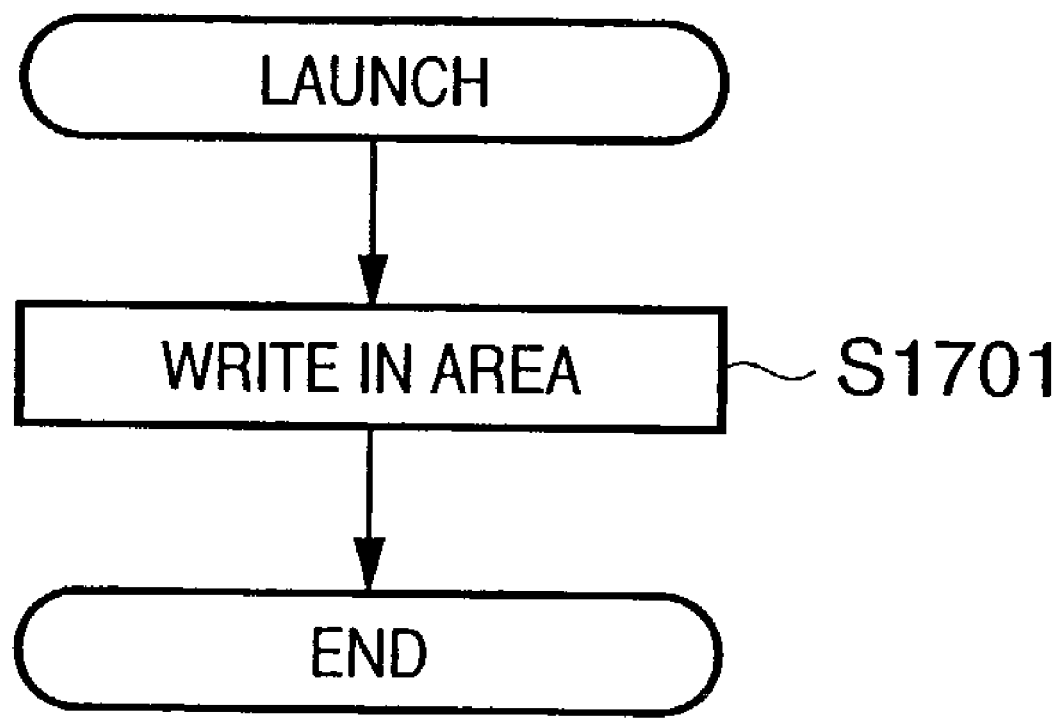
FIG. 17 is a flow chart showing a process for writing data in a storage area 601.

FIG. 17 is a flow chart showing a process for directly writing data in the storage area 601. After the application is launched, values internally held by the print edit application are written in the storage area 601 in step S1701.

Note that the print edit application as the output destination can be launched at the timing of installation of the printer driver, or can be called from the internal process of the printer driver, and can change print setups when it is called at an arbitrary timing.

As described above, the number of rendering requests output from the printer driver can be controlled in accordance with the number of rendering requests that can be output from the rasterize module which interprets control codes output from the control code generation module (printer driver).

Since the printer driver deletes rendering output requests beyond the interpretation performance of the rasterize module, the rendering result itself becomes different from print data held by the application. However, the print and display operations can be avoided from being canceled halfway through due to the characteristics of each rasterize module.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

To recapitulate, according to the present invention, since the application can set the total number of control codes that can be printed out by the printing apparatus in the control code generator, any errors due to insufficient memory resources and hardware limitations can be avoided. Also, since the total number of control codes that can be generated is not fixedly designated in all applications, the control code generator such as a printer driver or the like can execute appropriate processes in consideration of limitations on these applications.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus having a first application program which outputs drawing data, a printer driver which converts the output drawing data into control codes in units of page and a second application program which inputs the converted control codes, the apparatus comprising:

setting means for setting the total number of control codes that the second application program can input, by the second application program;

control code conversion means for converting the output drawing data into the control codes in units of page, by using the printer driver;

reading means for reading the total number of control codes set by said setting means, in a case where the output destination of the printer driver is the second application program; and determination means for determining whether or not the number of control codes converted by said control conversion means exceeds the total number of control codes read by said reading means, wherein, in a case where it is determined by said determination means that the number of control codes exceeds the total number of control codes read by said reading means, said control code conversion means stops converting subsequent control codes.

2. The apparatus according to claim 1, wherein the total number of control codes is the maximum number of rendering data in at least one page.

3. The apparatus according to claim 1, wherein the total number of control codes is the maximum number of rendering data in a whole print job converted by said control code conversion means.

4. A control code generation method having a first application program which outputs drawing data, a printer driver which converts the output drawing data into control codes in units of page and a second application program which inputs the converted control codes, the method comprising:

a setting step of setting the total number of control codes that the second application program can input, by the second application program;

a control code conversion step of converting the output drawing data into the control codes in units of page, by using the printer driver;

a reading step of reading the total number of control codes set by said setting means, in a case where the output destination of the printer driver is the second application program; and a determination step of determining whether or not the number of control codes convened in the control conversion step exceeds the total number of control codes read in the reading step, wherein the control code conversion step includes a step of stopping converting subsequent control codes in a case where it is determined in the determination step that the number of control codes exceeds the total number of control codes read in the reading step.

5. The method according to claim 4, wherein the total number of control codes is the maximum number of rendering data in at least one page.

6. The method according to claim 4, wherein the total number of control codes is the maximum number of rendering data in a whole print job converted in the control code conversion step.

7. A program for making a computer implement a control code generation method of claim 4.

8. A computer readable recording medium recording a program of claim 7.

* * * * *